United States Patent [19]
Bucher et al.

[11] Patent Number: 6,094,604
[45] Date of Patent: Jul. 25, 2000

[54] COORDINATED CONTROL OF SHEET PROPERTIES BY RECEIVING A MEASURED AND BROADCASTED PROPERTIES DATA, DETERMINING A CONTROL ACTION, AND BROADCASTING A PREDICTED CHANGES TO OTHER ACTUATORS

[75] Inventors: Robert Bucher, West Vancouver; Edwin Michael Gyde Heaven, North Vancouver, both of Canada; John King, Ascot, United Kingdom; Robert N. Vyse, Vancouver, Canada

[73] Assignee: Honeywell Measurex Devron Inc., North Vancouver, Canada

[21] Appl. No.: 09/036,722

[22] Filed: Mar. 6, 1998

[51] Int. Cl.$^7$ .............................. G06F 19/00; G05B 13/04
[52] U.S. Cl. ................................ 700/129; 700/4; 700/30; 700/101; 700/128; 709/201
[58] Field of Search ....................... 700/29–31, 127–129, 700/19.2, 4, 100.101; 709/201

[56] References Cited

U.S. PATENT DOCUMENTS

| | | | |
|---|---|---|---|
| 4,989,893 | 2/1991 | Kowatsch et al. | 280/625 |
| 5,381,341 | 1/1995 | Herrala et al. | 364/471.03 |
| 5,771,174 | 6/1998 | Spinner et al. | 364/471.03 |
| 5,812,404 | 9/1998 | Hamalainen et al. | 364/471.02 |
| 5,893,055 | 4/1999 | Chen | 702/189 |
| 5,978,753 | 11/1999 | Eidson | 702/188 |

OTHER PUBLICATIONS

Bernard Friedland—Control System Design An Introduction to State–Space Methods (McGraw Hill Book Company)—pp. 22–25.

Manness et al.,—The Application of Eigenstructure Assignment to the Coordinated Control of Multiple . . . Machines, a paper presented at Control Systems 92 held Sep. 28–Oct. 1, 1992 at Whistler, British Columbia, Canada.

Heaven et al.,—Recent Advances in Cross Machine Profile Control, IEEE Conrol System Magazine, Oct. 1994 pp. 35–46.

Heaven et al.,—Application of Systems Identification to Paper Machine Model Development and Simulation published in Pulp and Paper Canada 97 (4) :T138–143 (Apr. 1996).

Donald B. Brewster., Profile Control by Distributed Control Systems: Dream or Reality? Tappi Journal Feb. 1989 pp. 75–81.

Michael P. Lukas., Distributed Control Systems, Their Evaluation and Design., VAn Nostrand Reinhold Company New York, 1986 pp. 111–157 (vii–xii).

Lennart Haglund and Olle Alsholm., Integrated Systems: State of the Art., Pulp and Paper International, Feb. 1981 (pp. 63–67 & 70).

*Primary Examiner*—Thomas C. Lee
*Assistant Examiner*—Ilwoo Park
*Attorney, Agent, or Firm*—Christie, Parker & Hale, LLP

[57] ABSTRACT

A method for controlling the properties of a sheet of material to be manufactured on a sheet making machine using a network of intelligent actuators distributed across and down the length of the paper machine. The method includes the steps of measuring and acquiring properties data about the sheet of material and communicating the measured properties data as the data becomes available to the actuators that control the properties of the sheet of material. A control action for each actuator is calculated and implemented using a control model of each actuator's influence on the properties of the sheet so as to minimize the variation of the measured properties data from a desired target. The control action made at an actuator and the predicted changes in the measured properties based on the control model are also communicated to all the actuators. The control actions of all actuators are co-ordinated such that the actuators co-operate to minimize the variation of the measured properties data sheet from desired targets.

12 Claims, 2 Drawing Sheets

COORDINATED CONTROL OF SHEET PROPERTIES BY RECEIVING A MEASURED AND BROADCASTED PROPERTIES DATA, DETERMINING A CONTROL ACTION, AND BROADCASTING A PREDICTED CHANGES TO OTHER ACTUATORS

FIELD OF THE INVENTION

This invention relates generally to sheetmaking equipment and, more particularly, to a control system and method for controlling the properties of a sheet being manufactured on the sheetmaking equipment using a network of intelligent actuators that communicate with each other.

BACKGROUND OF THE INVENTION

Modern sheetmaking equipment, particularly equipment for the manufacture of sheet paper, uses a series of actuators distributed over the sheet being manufactured to adjust the various properties of the sheet such as caliper, moisture content, etc. The actuators control properties over the length of the sheet in the direction the sheet is moving on the equipment (the machine direction (MD)), and also across the width of the sheet in the cross direction (CD). Various sensors are positioned at locations along the sheet under manufacture to scan properties of the sheet and collect data to establish a profile across the sheet with respect to a particular property. This data is processed by a supervisory controller and control information (control actions, setpoints, status, positions) fed back to the appropriate actuators to adjust the properties under their influence toward a desired goal.

Conventional cross direction profile control and machine direction control reside in a hierarchical structure of a supervisory computer and an independent, distributed set of regulatory controllers performing basic actuator regulation in accordance with instructions from the supervisory computer. Profiles and other measured values are sent to the supervisory computer which generates setpoints and sends them to the various regulatory controllers which are responsible for moving and maintaining the associated actuators at the desired supervisory setpoint. The control algorithms to determine the position, movement power level of the actuators is centralized in the supervisory computer.

There is generally some coordination performed by the supervisory computer of the setpoints determined for machine direction control, such as decoupling the weight and moisture MD control. There is also some coordination performed by the supervisory computer for CD control such as coordinating the use of steam and rewet actuators controlling the moisture profile. However, there is little overall coordination of all the CD actuators controlling all the various property profiles such as weight, moisture, and caliper. In general, there is little or no coordination between MD properties and CD properties performed by the supervisory computer.

In conventional sheetmaking equipment, the distribution of the supervisory and regulatory control in a hierarchy allows dedicated computer use for specific purposes. In the past, this arrangement had advantages when slower computers and input/output devices were all that were available. This arrangement also has speed advantages since the regulation of one actuator or a set of actuators is performed independently of other actuators. At the same time, it follows that independent operation at the regulatory level of different sets of actuators does not allow various sets of actuators to be aware of upstream actions with the result that different sets of actuators may work against each other.

SUMMARY OF THE INVENTION

Applicant has developed a control system and method which overcomes the drawbacks of the prior art by moving the supervisory cross direction profile and machine direction control down to a network of intelligent actuators distributed across and down the length of the sheet making machine. These intelligent actuators comprise cross-direction actuators (slice, steambox, rewet sprays, caliper etc) and can also include machine direction actuators such as thick stock flow valves, dryer steam flow, etc.

Accordingly, the present invention provides a method for controlling the properties of a sheet of material to be manufactured on a sheet making machine that includes actuators to control the sheet properties comprising the steps of:

a) measuring and acquiring properties data about the properties of the sheet of material;

b) communicating the measured properties data as soon as the data becomes available to all the actuators;

c) calculating and implementing a control action for each actuator using a control model of each actuator's influence on the properties of the sheet so as to minimize the variation of the measured properties data from a desired target;

d) communicating the control action made at an actuator and the predicted changes in the measured properties based on the control model to all the actuators; and e) co-ordinating the control actions of all actuators such that the actuators co-operate to minimize the variation of the measured properties data from desired targets.

In a further aspect the present invention provides a system for controlling the properties of a sheet of material to be manufactured on a sheet making machine comprising:

a plurality of actuators distributed over the sheet of material that are controllable to vary the properties of the sheet of material;

a communication network connecting together the actuators for communication with each other;

scanners distributed over the sheet of material to measure and acquire properties data about the properties of the sheet of material, the scanners being connected to the communication network for broadcasting properties data over the network;

control means associated with each actuator that includes a model of the actuator's influence on the properties of the sheet for determining control actions for the actuator and for calculating resulting changes in the sheet properties due to the action of the actuator, the changes in the sheet properties being broadcast over the network as revised properties data;

whereby the control means of each actuator receives properties data from the scanners and revised properties data from other actuators for determining and implementing appropriate control actions such that the actuators co-operate to adjust the properties of the sheet of material to desired targets.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
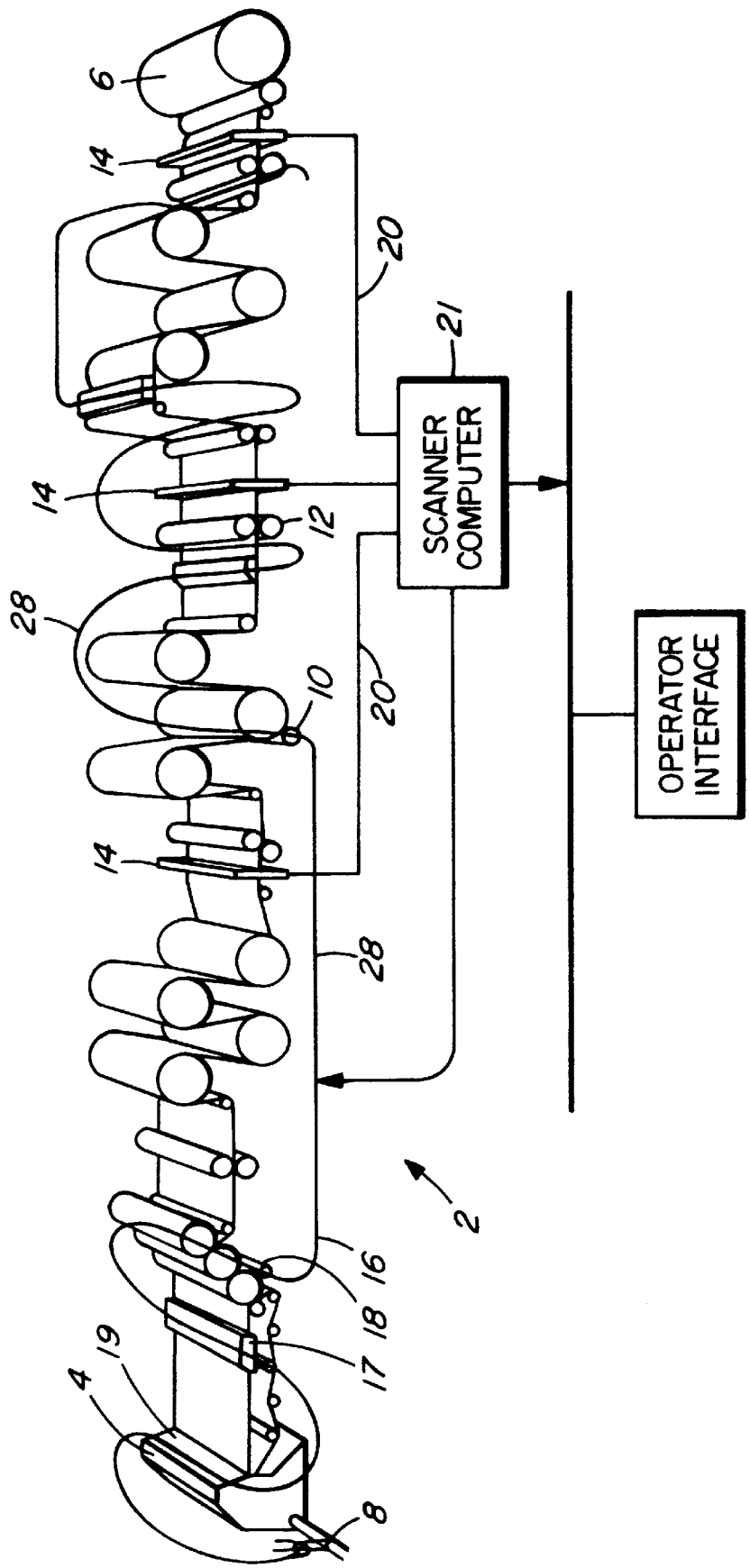
FIG. 1 shows a schematic view of the control system of the present invention.

Referring to FIG. 1, there is shown a paper making machine 2 according to the present invention. The paper making machine is arranged as an assembly line that extends from a stock tank 4 containing raw stock to a reel of finished paper product 6. In between the tank and the finished paper product, a series of rollers constrain the web of paper as it is manufactured and fed past various actuators that control properties of the paper such as headbox actuators 19, moisture actuators, caliper actuators 12 and coat weight actuators. The foregoing actuators are cross direction actuators and the apparatus and method of the present invention also includes machine direction actuators such as thick stock flow valves 8 and dryer steam flow. For example, in FIG. 1 at headbox 4, thick stock flow valve 8 controls the overall weight of the paper to be manufactured. Further along, steam box actuators 17 and 18 at the paper machine wet end control the moisture content of the paper web. Caliper control actuators 12 adjust the caliper or thickness of the paper web. Also included in the assembly line are scanners 14 that measure and acquire data about the various properties of the paper web under manufacture. It will be understood that the particular actuators and scanners shown in FIG. 1 are for illustrative purposes only and any arrangement of actuators and scanners is dependent on the sheet of material to be manufactured.

The actuators of the present invention are intelligent actuators 25 that are connected to each other and scanners 14 by a communications network 16. The intelligent actuators are electromechanical devices with built-in microcontrollers containing logic and regulatory control. Two-way communication between the intelligent actuators is accomplished across network 16. The measured properties data acquired by the scanners 14 is broadcast over the network as the data becomes available. Network 16 is a high speed, lan-like network connecting together the actuators for two-way, peer-to-peer communication between all actuators on the network.

Figure 2:
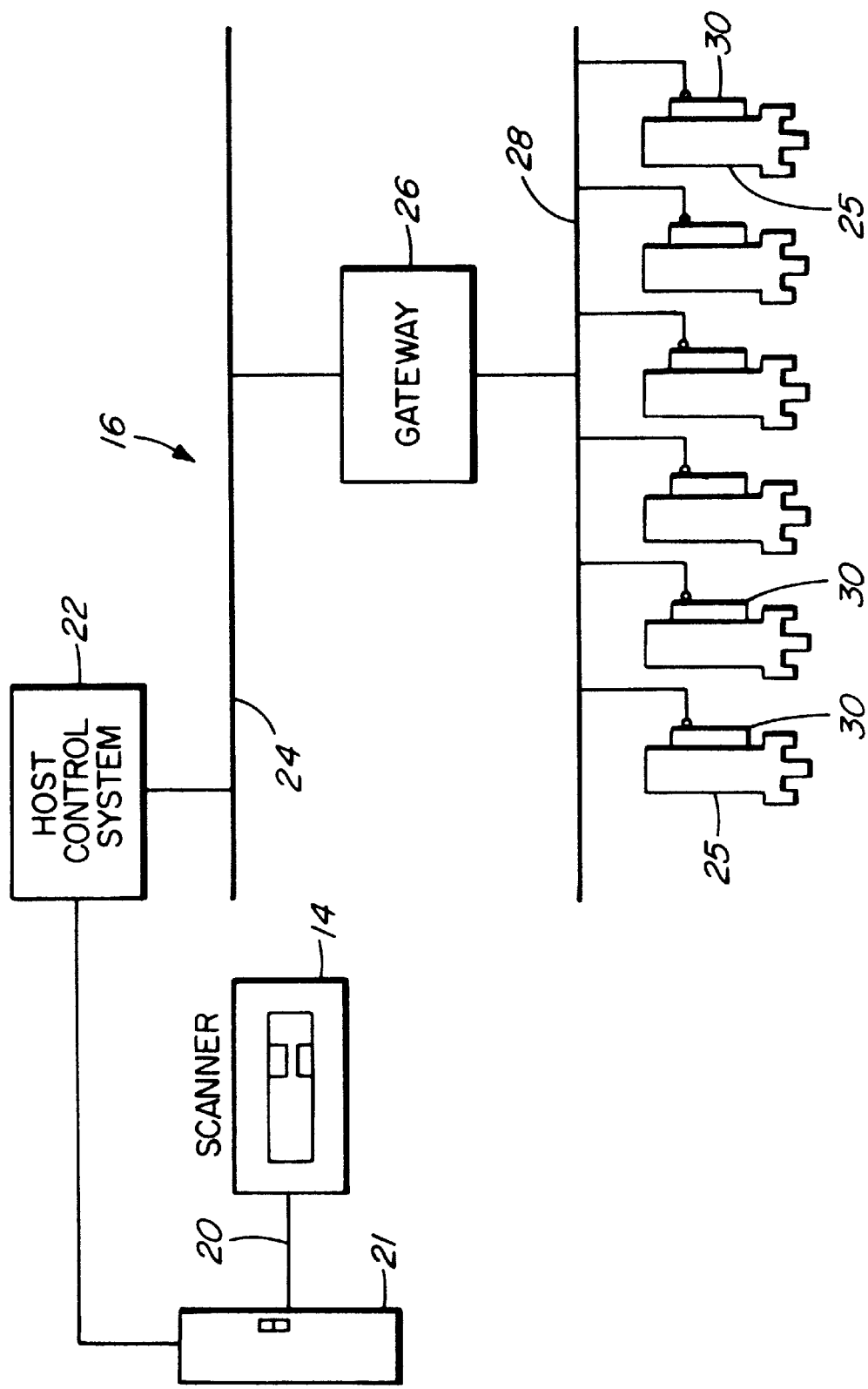
FIG. 2 is a detail schematic view showing the interconnection of the intelligent actuators of the present system with the control network.

FIG. 2 is a schematic view illustrating a preferred manner in which intelligent actuators 25 are connected together in a network configuration. The scanners 14 of the system measure properties from the sheet of material being manufactured and communicate this data via lines 20 to scanner computer 21 which stores and re-broadcasts the data. Scanner computer 21 communicates properties data to a host control system 22 which, in turn, communicates this data via ethernet LAN 24 to gateway 26. Gateway 26 communicates the properties data over a power and signal bus 28 to the various intelligent actuators 25 of the system.

By way of example, actuators 25 illustrated in FIG. 2 are motorized actuators for cross-direction weight control of the paper web. Intelligent actuators that control other properties work on the same principle as the motorized actuators illustrated. Each actuator 25 is equipped with control means comprising an "on-board" computer 30 that is connected via bus 28 to an array of identical peer actuators. Each computer 30 can poll and receive information from all other actuators and the gateway 26 which provides measured properties data. Each computer 30 runs a resident program to allow each actuator to make decisions regarding appropriate control actions based on information received from peer actuators and based on the measured properties data. Details of the communication system between actuators are disclosed in pending U.S. patent application Ser. No. 08/766,758 by inventors Robert E. Spinner et al. entitled "Distributed Intelligence Actuator Controller with Peer to Peer Actuator Communication" and assigned to the same owner as the present application. Pending application Ser. No. 08/776,758, now U.S. Pat. No. 5,771,175, is incorporated herein by reference.

Returning to the overall system view of FIG. 1, each measurement of properties data broadcast over network 16 preferably comprises a measured property value, the time of measurement and the location of measurement in the cross machine direction. The "on-board" computer 30 associated with each intelligent actuator is programmed with a two dimensional model (cross machine and machine direction) of how the actuator influences each of the measured properties of the sheet. In many cases, the influence of a particular actuator on a measured property will be zero. For example, actuators on the front of the papermaking machinery will have no influence on property measurements made on the back of the machine.

The model of each actuator's influence on sheet properties is determined using system identification algorithms that employ input/output data recorded over a pre-defined period of excitation of the actuators. All actuators are excited using linear independent sequences and the influence of each actuator on all measured properties is determined. Details of the foregoing technique can be found in the paper *Application of Systems Identification to Paper Machine Model Development and Simulation* by Heaven et al. published in Pulp and Paper Canada 97(4):T138–143 (April 1996), the disclosure of which is incorporated herein by reference. The technique involves exciting the actuators of the papermaking machine and collecting data (y). A least squares fit of the input/output model is obtained by minimizing the squared error of the model output ($\hat{y}$) less the actual output. This involves minimizing the matrix J, where $J=(\hat{y}-y)^2$ subject to $$\dot{X}=Ax+Bu$$

$$\hat{Y}=Cx+Du$$

where A,B,C & D are model parameters, x represents the system state, y is the model output and u is the input data (actuator position). This state-space representation of the system is established according to the principles set out in the reference *Control System Design An Introduction to State-Space Methods* by Bernard Friedland (McGraw Hill Book Company) which is incorporated herein by reference.

Each time a particular type of paper is manufactured having different properties, the intelligent actuators of the present invention have to be recalibrated by replacing the model stored in the microprocessor of each actuator with a model appropriate for the particular type of paper.

Based on the measured property data received and the stored model, each intelligent actuator calculates and implements a control action so as to minimize the variation of the measured properties data from a desired preset target. The control action made at an actuator and the predicted changes in the measured properties based on the control model are communicated to all the actuators via network 16.

In addition, each actuator has a priority assigned to the properties the actuator is able to control based on the actuator's ability to influence the measured properties. When calculating a control action, the assigned priority is used to determine the importance of the actuator in minimizing the variation of the measured property from a desired target. For example, slice actuators would normally have a first priority assigned to minimizing the dry weight variation of the sheet of material, minimizing the moisture variation as a second priority and minimizing caliper variation as a third priority. A steam box actuator would normally have a first priority of minimizing moisture variation and would be programmed to ignore the dry weight profile of the sheet of material. Multiple moisture actuators would each have a top priority of minimizing the variation of the moisture profile from a desired target.

It is necessary to co-ordinate the control actions of all actuators so that the actuators co-operate to minimize the variation of the measured properties data sheet from desired targets. A preferred method of coordinating the control actions of the actuators is achieved by a distributed multi-variable control scheme using weighted minimum variance control, the weights being derived from the priorities assigned to the properties each actuator is able to control. This technique is discussed in the document *Recent Advances in Cross Machine Profile Control* by Heaven et al., IEEE Control System Magazine, October 1994 pg.35–46, the disclosure of which is incorporated herein by reference.

The control scheme is distributed across communication network 16 with an element of the control algorithm running in each intelligent actuator. The control scheme can be extended to included both cross direction and machine direction variation as one control problem. Preferably, this extension of the control scheme to include both CD and MD variation as a one control problem is achieved by a technique referred to as eigenstructure assignment. This technique relies on the use of a feedback matrix to decouple the response of sheet properties. The basic technique is described in detail in *The Application of Eigenstructure Assignment to the Coordinated Control of Multiple Cross-Direction Actuators and Profiles on Paper Machines* by Manness et al., a paper presented at Control Systems 92 held Sep. 28–Oct. 1, 1992 at Whistler, British Columbia, Canada which is incorporated herein by reference.

There are several advantages to the method and apparatus of the present invention. Using the control method of the present invention, it is possible to have co-ordinated machine direction/cross direction control of the sheet properties. The properties data is broadcast as soon as it is available and it is no longer necessary to complete a scan in the cross-direction before property control can be implemented. By establishing a network of intelligent actuators, the supervisory control computer of the prior art is eliminated.

Although the present invention has been described in some detail by way of example for purposes of clarity and understanding, it will be apparent that certain changes and modifications may be practised within the scope of the appended claims.

We claim:

1. A method for controlling the properties of a sheet of material to be manufactured on a sheet making machine that includes actuators to control the sheet properties comprising the steps of:
    a) measuring and acquiring properties data about the properties of the sheet of material;
    b) communicating the measured properties data as soon as the data becomes available to all the actuators;
    c) calculating and implementing a control action for each actuator using a control model of each actuator's influence on the properties of the sheet so as to minimize the variation of the measured properties data from a desired target;
    d) communicating the control action made at an actuator and the predicted changes in the measured properties based on the control model to all the actuators; and
    e) coordinating the control actions of all actuators such that the actuators co-operate to minimize the variation of the measured properties data from desired targets.

2. A method as claimed in claim 1 in which the cross direction and machine direction properties of the sheet material are measured and acquired.

3. A method as claimed in claim 2 in which the model used by each actuator is a two dimensional model in the cross direction and the machine direction of the actuator's effect on each of the measured properties of the sheet.

4. A method as claimed in claim 1 in which the measured properties data comprises a measured property value, a time that the measured property value was acquired and a location that the measured property value was acquired.

5. A method as claimed in claim 3 in which the model for each actuator is determined using system identification algorithms that employ input/output data recorded over a pre-defined period of excitation of the actuators.

6. A method as claimed in claim 4 including the step of assigning priorities to the properties each actuator is able to control based on the actuator's ability to influence the measured properties.

7. A method as claimed in claim 6 in which the step of co-ordinating the control actions of the actuators is achieved by a distributed multivariable control scheme using weighted minimum variance control, the weights being derived from the priorities assigned to the properties each actuator is able to control.

8. A method as claimed in claim 1 in which the communication steps are carried out over a high speed network interconnecting the actuators of the sheet making machine.

9. A method as claimed in claim 1 in which the step of measuring and acquiring properties data is done by a plurality of scanners.

10. A system for controlling the properties of a sheet of material to be manufactured on a sheet making machine comprising:
    a plurality of actuators distributed over the sheet of material that are controllable to vary the properties of the sheet of material;
    a communication network connecting together the actuators for communication with each other;
    scanners distributed over the sheet of material to measure and acquire properties data about the properties of the sheet of material, the scanners being connected to the communication network for broadcasting properties data over the network;
    control means associated with each actuator that include a model of the actuator's influence on the properties of the sheet for determining control actions for the actuator and for calculating resulting changes in the sheet properties due to the action of the actuator, the changes in the sheet properties being broadcast over the network as revised properties data;
    whereby the control means of each actuator receives properties data from the scanners and revised properties data from other actuators for determining and implementing appropriate control actions such that the actuators co-operate to adjust the properties of the sheet of material to desired targets.

11. A system as claimed in claim 10 in which the communications network is a high speed lan-like network.

12. A system as claimed in claim 10 in which the control means of the actuators comprises an on-board computer associated with each actuator.

* * * * *